United States Patent
Dabbiere et al.

(10) Patent No.: US 11,283,803 B2
(45) Date of Patent: *Mar. 22, 2022

(54) INCREMENTAL COMPLIANCE REMEDIATION

(71) Applicant: AirWatch LLC, Atlanta, GA (US)

(72) Inventors: Alan Dabbiere, McLean, VA (US); Erich Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/869,366

(22) Filed: May 7, 2020

(65) Prior Publication Data
US 2020/0267157 A1 Aug. 20, 2020

Related U.S. Application Data (63) Continuation of application No. 13/839,112, filed on Mar. 15, 2013, now Pat. No. 10,652,242.

(51) Int. Cl.
H04L 29/06 (2006.01)
G06F 21/62 (2013.01)
G06Q 10/06 (2012.01)

(52) U.S. Cl.
CPC .............. H04L 63/10 (2013.01); G06F 21/62 (2013.01); G06Q 10/0631 (2013.01)

(58) Field of Classification Search
CPC ......... H04L 63/10; H04L 29/06; H04L 63/00; G06F 21/62; G06F 21/60; G06F 21/00; G06Q 10/0631; G06Q 10/06
See application file for complete search history.

(56) References Cited

U.S. PATENT DOCUMENTS

| 5,574,786 A | 11/1996 | Dayan et al. |
| 5,987,609 A | 11/1999 | Hasebe |

(Continued)

FOREIGN PATENT DOCUMENTS

| CA | 2149337 A1 | 6/1994 |
| EP | 1625469 A1 | 2/2006 |

(Continued)

OTHER PUBLICATIONS

Frederic Lardinois: "Google Launches New Maps APis For Location Tracking And GPS-Free Geolocation: TechCrunch", Oct. 17, 2012 (Oct. 17, 2012), XP055122025.

(Continued)

*Primary Examiner* — Quazi Farooqui
(74) *Attorney, Agent, or Firm* — Thomas | Horstemeyer LLP (57) ABSTRACT

Disclosed are various embodiments for enforcing device compliance parameters by inhibiting access to devices, networks or resources. In one embodiment, among others, a computing device identifies a request to access a first resource and determines that a second resource is associated with accessing the first resource based on a resource group identifier. The computing device determines that a compliance rule is associated with the first resource and the second resource based on the resource group identifier. The client device can determine that the compliance rule has been violated. Then, the computing device determines that the compliance rule is associated with an alternative setting and changes the current setting to the alternative setting.

17 Claims, 2 Drawing Sheets

(56) References Cited

U.S. PATENT DOCUMENTS

| | | |
|---|---|---|
| 6,021,492 A | 2/2000 | May |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,233,341 B1 | 5/2001 | Riggins |
| 6,560,772 B1 | 5/2003 | Slinger |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,225,249 B1 | 5/2007 | Barry et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | Mackenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,496,957 B2 | 2/2009 | Howard et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 8,225,381 B2 | 7/2012 | Lemke |
| 8,239,915 B1 | 8/2012 | Satish et al. |
| 8,499,331 B1 | 7/2013 | Yehuda et al. |
| 2002/0013721 A1 | 1/2002 | Dabbiere et al. |
| 2003/0110084 A1 | 6/2003 | Eberhard et al. |
| 2003/0204716 A1 | 10/2003 | Rockwood et al. |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0246192 A1 | 11/2005 | Jauffred et al. |
| 2005/0257267 A1* | 11/2005 | Williams ............ H04L 63/0227 726/25 |
| 2006/0190984 A1 | 8/2006 | Heard et al. |
| 2007/0033397 A1 | 2/2007 | Phillips, II et al. |
| 2007/0094471 A1 | 4/2007 | Shaath et al. |
| 2007/0136492 A1 | 6/2007 | Blum et al. |
| 2007/0156897 A1 | 7/2007 | Lim |
| 2007/0165607 A1 | 7/2007 | Mussman et al. |
| 2007/0174433 A1 | 7/2007 | Mendez et al. |
| 2007/0261099 A1 | 11/2007 | Broussard et al. |
| 2007/0288637 A1 | 12/2007 | Layton et al. |
| 2008/0046961 A1 | 2/2008 | Pouliot |
| 2008/0133712 A1 | 6/2008 | Friedman et al. |
| 2008/0134305 A1 | 6/2008 | Hinton et al. |
| 2008/0134347 A1 | 6/2008 | Goyal et al. |
| 2008/0201453 A1 | 8/2008 | Assenmacher |
| 2008/0244690 A1 | 10/2008 | Kulkarni et al. |
| 2009/0036111 A1 | 2/2009 | Danford et al. |
| 2009/0055897 A1 | 2/2009 | Morgan et al. |
| 2009/0144632 A1 | 6/2009 | Mendez |
| 2009/0164649 A1 | 6/2009 | Kawato |
| 2009/0198997 A1 | 8/2009 | Yeap et al. |
| 2009/0260064 A1 | 10/2009 | Mcdowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0198547 A1 | 8/2012 | Fredette et al. |
| 2012/0207285 A1 | 8/2012 | Lawson et al. |
| 2012/0297444 A1 | 11/2012 | Kacherov et al. |
| 2013/0007245 A1 | 1/2013 | Malik et al. |
| 2013/0061307 A1 | 3/2013 | Livne |
| 2013/0152169 A1 | 6/2013 | Stuntebeck |

(56) References Cited

U.S. PATENT DOCUMENTS

| | | | |
|---|---|---|---|
| 2013/0179993 A1* | 7/2013 | Sandler | G06F 21/60 |
| | | | 726/30 |
| 2014/0033326 A1 | 1/2014 | Chien | |
| 2014/0155094 A1 | 6/2014 | Zises | |

FOREIGN PATENT DOCUMENTS

| | | |
|---|---|---|
| EP | 2444930 A1 | 4/2012 |
| GB | 2346716 A | 8/2000 |
| WO | 0241661 A2 | 5/2002 |

OTHER PUBLICATIONS

Nokia: "Nokia 3110 classic/Nokia 3109 classic User Guide", Jan. 1, 2007 (Jan. 1, 2007), XP055122026.

Chris Foresman: "How to make the best of iOS 6's Do Nol Disturb feature 1 Ars Technica", Sep. 19, 2012 (Sep. 19, 2012), pp. 1-5, XP055122023.

Asynchrony Software, Inc., , "PDA Defense User Guide", 726, 2002.

Belani, Eshwar et al., "The CRISIS Wide Area Security Architecture", 726, 1998.

Benaloh, Josh et al., "Patient Controlled Encryption: Ensuring Privacy of Electronic Medical Records", 726, Nov. 13, 2009.

Fox, Armando et al., "Security on the Move: Indirect Authentication Using Kerberos", 726, 1996.

Menaria, Pankaj et al., "Security in Mobile Database Systems", 707, 726, Mar. 17, 2011.

Pfitzmann, Andreas et al., "Mobile User Devices and Security Modules: Design for Trustworthiness", 726, Feb. 5, 1996.

Steiner, Jennifer , "Kerberos: An Authentication Service for Open Network Systems", 726, Jan. 12, 1988.

Strunk, John et al., "Self-Securing Storage: Protecting Data in Compromised Systems", Symposium On Operating Systems Design and Implementation, 726, 2000.

\* cited by examiner

INCREMENTAL COMPLIANCE REMEDIATION

CROSS REFERENCE TO RELATED APPLICATIONS

This is a continuation application that claims priority to and the benefit of U.S. Non-provisional patent application Ser. No. 13/839,112, entitled "INCREMENTAL COMPLIANCE REMEDIATION" and filed on Mar. 15, 2013, which is incorporated by reference as if set forth herein in its entirety.

BACKGROUND

Controlling access to and distribution of resources, such as documents, databases, and executable applications, in a networked environment is critical to ensure that only authorized users and network-connected devices may gain access to sensitive information. Depending on the sensitivity of a given resource, an array of authorization rules may be necessary to ensure that the resource is adequately protected. Some resources may only require ensuring that the proper user is requesting the resource. Other resources may require compliance with more stringent authorization rules, such as determining whether an appropriate transport protocol is used (i.e., http and/or https) by the requesting device, determining whether access to the resource is permitted for a specified duration or at a given time, determining whether the resource is accessed from a secured device, etc.

Some prior resource management systems may grant access to enterprise resources based in part on user access credentials, such as usernames and passwords. Additional security may be provided by requiring that authorized usernames and passwords be submitted using specific client devices (e.g., identified by approved device identifiers) and/or that such client devices comply with certain configuration requirements or other rules associated with the enterprise resources to be accessed.

However, there may also be a need, particularly with respect to devices that are not fully managed by a Mobile Device Management (MDM) system, or the like, for alternatives that encourage users to comply with certain device settings, configuration requirements, usage, and other parameters.

SUMMARY OF THE INVENTION

The following systems and methods provide solutions for enforcing device compliance parameters by inhibiting access to devices, networks or resources.

Among other objects, the present subject matter may provide the ability to encourage user compliance with rules related to device settings, configuration requirements, usage, and other parameters, without having to block the user from accessing the device, network or resources outright or in all circumstances. Such methods may be advantageous, for example, by reducing more burdensome corrective actions, as well as by exerting a level of influence over users of devices that are not fully managed by a Mobile Device Management (MDM) system or the like.

According to certain embodiments, methods may include one or more steps of associating a compliance rule with a client device, determining whether the compliance rule is violated, and/or altering a setting associated with the client device based on the compliance rule being violated. In some embodiments, the altered setting may inhibit access to at least one of the client device, a network, a client device resource and a network resource. In some embodiments, the client device resource and/or the network resource may include at least one of an application, a computer folder, a data file, an electronic document and a network address.

Altering a setting associated with the client device may include restricting access to at least of the client device resource or the network resource and/or restricting a communication function of the client device. In some embodiments, altering the setting may include increasing a required password complexity for at least one of the client device or the network, and/or decreasing a password lifetime for at least one of the client device or the network. In some embodiments, settings may be altered based on a geofence, a day, a time of day, a day of the week and/or based on instructions provided by a remote server. Some embodiments may further include sending, or receiving, an alert from the client device to a remote server including an indication of the altered setting. In response to such an alert, the server may initiate a remedial action, such as sending a message to the user of the device (e.g., a text message), altering access requirements to a network resource, etc In some embodiments, determining whether the compliance rule is violated may be based on, for example, event logs maintained by the client device or a remote server, profile information stored on the client device, application update information, device settings or configuration requirements, usage, and/or other parameters. In some embodiments, determining whether the compliance rule is violated may be performed on the client device and/or on a remote server.

According to certain further embodiments, an apparatus including a two-way communication device, a display and a processor may be configured to perform the various method steps and functions described herein. According to certain embodiments, the various method steps and apparatus functions described herein may be embodied on non-transitory electronic storage medium in the form of computer-readable instructions that, when executed by a microprocessor, cause a computer system perform the described functions and steps. Additional features, advantages, and embodiments may be set forth or apparent from consideration of the following detailed description, drawings, and claims. Moreover, it is to be understood that both the foregoing summary and the following detailed description are provided by way of example only and intended to provide further explanation without limiting the scope of the claimed subject matter.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

It is to be understood that the subject matter disclosed and claimed herein is not limited to the particular methodology, protocols, etc. described herein, as the skilled artisan will recognize that these may vary in different embodiments. It is also to be understood that the terminology used herein is used for the purpose of describing particular embodiments only, and is not intended to limit the scope of the subject matter disclosed and claimed herein. It also is to be noted that as used herein and in the appended claims, the singular forms "a," "an," and "the" include the plural reference unless the context clearly dictates otherwise. Thus, for example, a reference to "a rule" is a reference to one or more rules and equivalents thereof known to those skilled in the art.

The embodiments disclosed herein and the various features and advantageous details thereof are explained more fully with reference to the non-limiting embodiments and examples that are described and/or illustrated in the accompanying drawings and detailed in the following description. Descriptions of well-known components and computing techniques may be omitted so as to not unnecessarily obscure the described embodiments. The examples used herein are intended merely to facilitate an understanding of ways in which the subject matter disclosed and claimed herein may be practiced and to further enable those of skill in the art to practice various embodiments.

Disclosed are various embodiments for a system and associated devices and methods for enforcing device compliance parameters by inhibiting access to devices, networks and/or resources.

Figure 1:
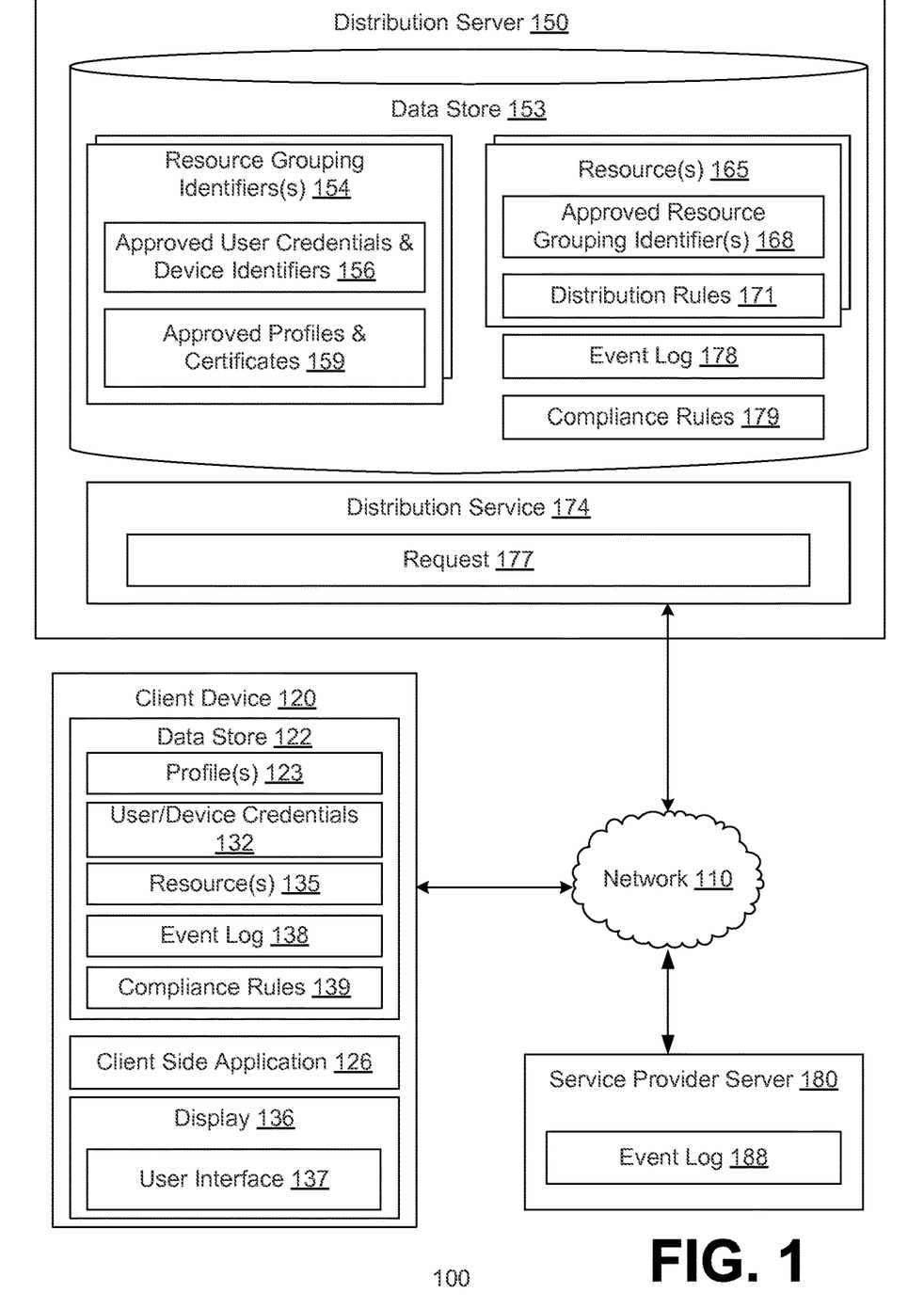
FIG. 1 is a block diagram of a networked environment according to certain embodiments consistent with the present disclosure.

FIG. 1 illustrates a networked environment 100 according to various embodiments. The networked environment 100 includes a network 110, a client device 120, and a distribution server 150. The network 110 may be or include, for example, any type of wireless network such as a wireless local area network (WLAN), a wireless wide area network (WWAN), or any other type of wireless network now known or later developed. Additionally, the network 110 may be or include the Internet, intranets, extranets, microwave networks, satellite communications, cellular systems, PCS, infrared communications, global area networks, or other suitable networks, etc., or any combination of two or more such networks. In some embodiments, the network 110 facilitates transmission of resources 165 between one or more client devices 120 and a distribution server 150.

The distribution server 150 may comprise, for example, a server computer or any other system providing distribution capability. For purposes of convenience, the distribution server 150 is referred to herein in the singular. Even though the distribution server 150 is referred to in the singular, it is understood that a plurality of distribution servers 150 may be employed in the arrangements as descried herein. The components executed on the distribution server 150, for example, include the distribution service 174 and other applications, services, processes, systems, engines, or functionality not disclosed in detail herein. The distribution service 174 may be executed to provide resources 165 stored in a data store 153 to a requesting client device 120 based on, for example, resource grouping identifiers 154 and distribution rules 171, as will be described.

The client device 120 may store, in a data store 122, a profile 123, user and/or device credentials 132, resources 135, and other data. Resources 135 may include any electronic data, such as databases, applications, text files, word processor files, spreadsheet files, presentation files, graphic files, audio files, photographic files, video files, applications and application files, and/or the like. More specifically, resources 135 may include: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

As noted, the distribution server 150 also includes a data store 153, which may include resources 165, as well as resource grouping identifiers 154, and/or other data. In some embodiments, the resources 165 referenced herein may include any electronic data, such as databases, applications, text files, word processor files, spreadsheet files, presentation files, graphic files, audio files, photographic files, video files, applications and application files, and/or the like. More specifically, resources 165 may include: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files. In some cases, the resources 135 stored on the client device may be copies or instances of resources 165 stored on the server 150. It should be understood that a "copy" of a resource need not be an exact reproduction of the original and may include, for example, lower resolution versions, compressed versions, hash functions or other representations sufficient to identify the original resource from the "copy" or to perform such other functions as may be required.

In certain embodiments, the data store 122 of the client device 120 may also include event logs 138 that may include records including, for example, information about certain client side applications 126, resources 135 and/or resources 165 being, or having been, accessed by the client device 120. One example of such a log may be a browsing history for a web browser of the client device 120, which maintains a listing of network addresses accessed, and/or other information. Another example may be a resource access log indicating certain resources 135, 165 that the client device 120 has accessed. The data store 153 of the distribution server 150 may also include event log 178 reflecting the same or similar information. An event log 188 maintained on service provider server 180 may also include similar information with respect to a particular service(s) provided, e.g. voice calls, text messages, internet or other network addresses accessed, etc. The event logs 138, 178, 188, and/or individual records within the logs, may take various forms and may include different levels of detail, as will be appreciated by those of skill in the art.

In certain embodiments, the data store 122 of the client device 120 may also include compliance rules 139. As used herein, a "compliance rule" should be understood as at least one parameter that defines a required state for a device, application, or other resource setting or configuration, as well as predefined device, application, or other resource, usage parameters. Accordingly, by way of non-limiting example, compliance rules 139 may include one or more of required profile(s), application update information, device settings or configuration requirements, and/or criteria related to event logs (e.g. blacklisted network addresses, data limits, etc.) or other usage parameters. Non-limiting examples of compliance rules 139 may also include (but are not) limited to hardware requirements, software requirements, maintenance requirements of a computing device, and/or requirements related to the resource 135 or 165.

In some embodiments, compliance rules 139 may be set by a service provider such as distribution service 174, and may be distributed to client devices 120 configured to utilize such services, e.g. resources, provided or otherwise supported by distribution service 174. The data store 153 of the distribution server 150 may also include compliance rules 179 reflecting the same or similar information. In this regard, it should be appreciated that, in some embodiments, a compliance rule 139 saved on the client device 120 may be the same as a compliance rule 179 saved on the distribution server 150. For example, a compliance rule 179 may be "pushed" by the distribution server 150 to the client device 120, and reflect the same compliance parameters. However, for ease of description and clarity, the compliance rules may referred to by different numbers depending on where they are saved.

The client device 120 may be configured to execute various applications. For example, the client device 120 may be configured to execute applications such as web browsing applications, email applications, instant messaging applications, and/or other applications capable of receiving and/or rendering resources 135 or 165 on a display 136 associated with the client device 120. Any applications capable of receiving and/or rendering resources on a display 136 is generally referred to herein as a "client side application" 126, even though some, or all, of the application program itself may reside on non-transitory storage medium of any device or server networked to the client device 120.

As discussed further below, in some embodiments, a client side application 126 may further include instructions that indicate a compliance rule 139, 179 associated with the application, or that recognize when a given resource 135, 165 is associated with a compliance rule 139, 179 and/or that initiate a compliance check. The client side application 126 may be configured to recognize that a given resource 135, 165 is associated with a compliance rule 139, 179 for example, based on an identifier of the resource, a resource group identifier 154, or specific instructions provided in association with the resource, such as a distribution rule 171. In some embodiments, the client side application 126 may be associated with a compliance rule 139, 179 that is checked for any use of the application 126.

It should be noted that, in some embodiments, a compliance rule 139, 179 may be distinguished from a distribution rule 171 in that the compliance rule 139, 179 may be used to inhibit access to a device, resource or network, without necessarily blocking access outright, or in all circumstances, whereas, a distribution rule 171 generally sets requirements that, if violated, block or terminate access to a device, resource or network. Accordingly, in some embodiments, user compliance can be encouraged while continuing to provide desired or necessary services.

Client side application 126 may include various levels of executable program code. For example, a set of instructions may be included in the client side application 126 that are executed when the application is called. This set of instructions may include a routine for initiating a compliance check and/or for identifying if a called resource 135, 165 is associated with a compliance rule, such as compliance rules 139 and/or 179.

Rules related to compliance parameters discussed herein may also be included in a profile 123, and may be set by a service provider that manages the called application, or that provides additional code for the called application to implement compliance checks (e.g., code in the form of a wrapper, plugin, or script for the called application or code distributed through an update, service pack or software development kit and added to the called application, etc.). As noted above, such compliance factors may include information related to event logs (e.g. blacklisted network addresses, etc.) or other usage parameters, required profile(s), application update information, device settings or configuration requirements, etc.

Profile 123 may also include a certificate, which may represent either, or both, of an algorithm for generating a unique certificate and/or the generated certificate itself. For example, in certain operating systems, the system may recognize that a profile 123 includes a root or intermediate certificate, and automatically store the certificate in a trust store, certificate store, or other storage element or protocol, generically referred to herein as a "trust store."

The certificate may be used to sign any resources or event logs, as discussed herein, and may, for example, uniquely associate the signed resource with the client device 120 or application 126. For example, a digital signature based on the certificate may be further based on one or more of a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers.

The user/device credentials 132 may uniquely identify the user of the client device 120 and/or the client device 120. For example, user credentials may include a username, a password, and/or biometric data related to facial recognition, retina recognition, fingerprint recognition, and the like. User credentials may be input by a user via any suitable client side application and may be stored in the data store 122 of the client device 120. Accordingly, user credentials may be retrieved from the data store 122 or may be input by a user in connection with a request for access to a resource 135, 165. Device credentials may take various forms and may include, for example, unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Device credentials may further include certificates that are uniquely tied to the device using one or more of the above, as previously mentioned.

Figure 2:
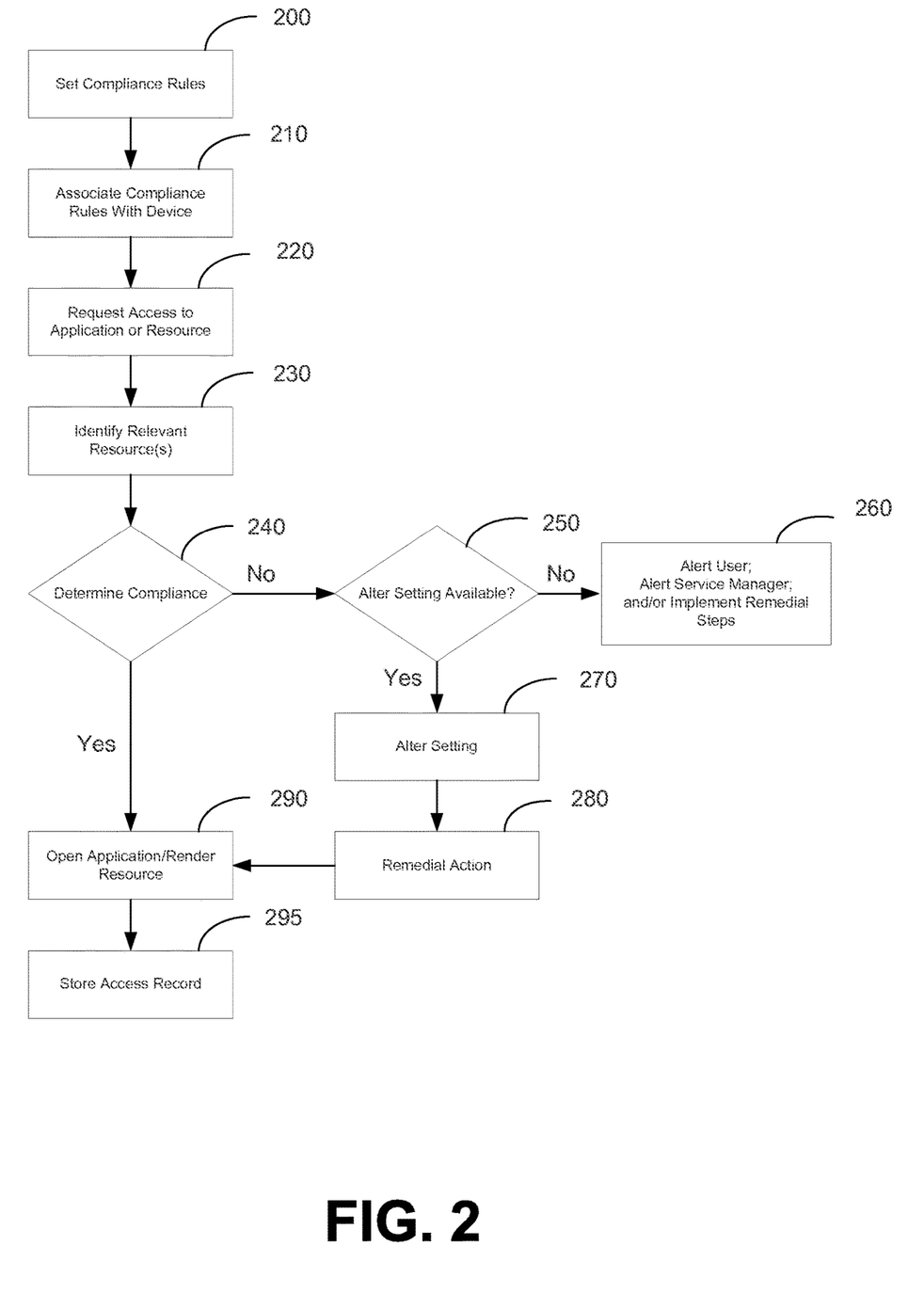
FIG. 2 is a flowchart illustrating an example of a process according to certain embodiments in the networked environment of FIG. 1.

FIG. 2 is a flowchart illustrating an example of a compliance process according to certain embodiments in the networked environment of FIG. 1. As shown in FIG. 2, the method may begin with step 200, in which compliance rules, such as compliance rules 139 and/or 179 may be set. As mentioned previously, compliance rules 139, 179 may typically be set by a service provider such as distribution service 174 shown in FIG. 1. Step 200 may include defining parameters included in compliance rules 139, 179, as well as, for example, associating the compliance rules 179 with various resources 165 and/or resource grouping identifiers 154, as described herein.

The method may continue with step 210, in which a compliance rule is associated with a client device 120. Such associations may be performed in a variety of ways. For example, in some embodiments, compliance rules 179 may be distributed by a network server to a client device, such as client device 120, and thereby stored as compliance rule 139 and associated with any of the client/device credentials 132, as stored in data store 122. In some embodiments, associating the client device with a compliance rule may include a series of steps, such as associating the compliance rule with a user level, or other category, and determining a user level, or other category, of a user of the client device. By way of further example, an association of the compliance rule and the client device may not be established until a certain application or resource is called. In the case of a called resource, such as a resource 165, the distribution server 150 may first associate a compliance rule 179 with the resource 165, and when the client device 120, or client side application 126, calls the resource 165, an association between the client device 120 and the relevant compliance rule 179 may be established. Other association processes are also included in other embodiments, by which compliance of the client device with the relevant compliance rule may be established.

The method may continue with step 220, in which the client device attempts to open an application or otherwise requests access to a resource. This may include, for example, a user request to open an application, or to open a file that requires an application that is not currently running. In embodiments where the request to access the resource includes a request to open an application, the application may be referred to as the "called application." In some embodiments, the request may initiate a limited opening or access to the called application in order to execute instructions that identify whether a compliance check is required, as discussed further below.

In some embodiments, such a step may be used as a trigger to initiate a compliance check. However, it should also be understood that compliance checks as described herein can be initiated in various ways, which need not be tied to a specific request to open an application or resource. For example, compliance checks may be performed at random or scheduled times, may be based on a remote request, such as from distribution service 174, and/or may be initiated based on historical or current usage information.

In some embodiments, a step of determining what resources correspond to the request provided in step 220 may also be performed. For example, the method may include an optional step 230, in which resources that are relevant to, or fall within, the request from step 220 are determined. Such determinations may be based on, for example, user credential information, resource grouping identifiers 154, and the like, as discussed further herein. A more detailed description of such a process, performed in coordination with a resource rendering step, is provided further below. However, in some embodiments, it may be preferable to perform such a step prior to the compliance check(s) in order to, for example, identify all relevant compliance rules 139, 179 that may apply to various resources covered by the request.

The method may continue with step 240, in which a determination may be made as to whether or not the compliance rule 139, 179 is violated. As will be appreciated, such determinations may be made in various ways depending, for example, of the nature of the compliance rule. For example, in circumstances where the compliance rule 139, 179 includes a parameter that requires the presence of a certain profile 123, the absence of a certain application, an updated version of an application, or other information that can be determined by inspecting information stored on the client device 120, compliance may be determined by an application, or application wrapper, running on the client device 120, that inspects the relevant information. In other embodiments, a remote server may send a query to the client device 120 to provide the relevant information such that the remote server can determine device compliance.

In some embodiments, the compliance may be based on usage information, such as current usage information, event log 138, stored on client device 120, and/or usage information stored on a remote server, such as event log 178 on distribution server 150 or event log 188 provided by service provider server 180. In some embodiments, the service provider server 180 may provide a particular service to client device 120 (e.g. a wireless voice or data plan), and distribution service 174 may establish compliance rules related to such services, such as voice minutes or data limits. Information relevant to the compliance rules of distribution service 174 may be provided to the distribution server 150 from the service provider server 180, or may be communicated in other forms, such as billing etc. Accordingly, the distribution service 174 may enforce or encourage compliance with respect to service(s) that they do not directly provide.

If step 240 indicates that the relevant compliance rule(s) are violated, the method may continue with step 250, in which a further determination may be made as to whether a setting alteration is available. The applicable setting alterations may be associated, for example, with particular compliance rules, and/or with device-specific or user-specific parameters. For example, compliance rules 139 and/or 179 may have one or more associated instructions, and which may be included therein, for altering a setting of a client device 120 or a setting of a network server accessible by the client device 120. Alternatively, or in addition to such instructions, a client device 120 may have installed instructions that may be called in the event of any relevant non-compliance.

In some embodiments, step 250 may be based on a determination of whether the compliance rule has an associated limiting instruction, and/or whether existing limitations have already been implemented. For example, if a rule has only one associated limiting instruction, and that instruction has already been implemented (e.g. the device or server is already set according to that instruction), then it may be determined that no further limitation is available. On the other hand, compliance rules may be associated with a plurality of limiting instruction (e.g. progressively more stringent limitations) that can be implemented separately and/or sequentially.

If step 250 indicates that no setting alteration is available, the method may continue with step 260. In step 260, a number of options are possible. In some embodiments, step 260 may be implemented after other access-inhibiting measures have proved unsuccessful in encouraging user compliance. This may involve, for example, the client device 120 displaying an alert to the user with, or without, instructions for correcting the problem, the client device 120 sending an alert to the distribution server 150 or the distribution service 174, the distribution server 150 or the distribution service 174 suspending communication with the client device 120, the distribution server 150 or the distribution service 174 sending an alert to the client device 120, with, or without, instructions for correcting the problem, etc.

In some embodiments, the client device 120 and/or distribution server 150 may initiate corrective and/or remedial measures as part of step 260, such as on the client device 120. For example, the user of client device 120 may agree to certain restrictions or remedial measures, when an application is first installed, or is modified with a wrapper provided by a service provider, that go into effect after other compliance measures have failed. The called application or another client side application 126 may be configured to automatically implement certain corrective and/or remedial measures or to do so in response to a command from the distribution service 174. Such measures may include disabling a wrapped client side application 126, deleting any local resources that were originally accessed via the distribution service 174, disabling enterprise resources 165, etc. In step 260 an alert may be sent to the user and/or service manager. The alert may include one or more of an identification of a compliance rule that failed, user identification, device identification, or other information.

If step 250 indicates that a setting alteration is available, the method may continue with step 270. In step 270, a setting associated with the client device 120 may be altered. As used herein, altering a setting "associated with the client device" may include making various modifications on the client device itself, e.g. in settings, profiles or other applications of the device, or at a server in such a way that access by the client device is inhibited. In some embodiments, the altered setting may inhibit access to at least one of the client device (such as client device 120), a network (such as distribution service 174, an intranet, or the internet), a client device resource (such as resource 135 and/or client side application 126) and/or a network resource (such as resource 165, or other intranet or internet resource). As described herein, the client device resource and/or the network resource may include, for example, an application, a computer folder, a data file, an electronic document, and/or a network address.

As used herein, "inhibiting" access to a resource should be understood as including altering the requirements for access to the resource, without prohibiting access outright or in all circumstances. For example, in embodiments where a password complexity is increased, the user is allowed regain access to the resource once a new password satisfying the new complexity is set. However, the user will have their access to the resource "inhibited" due both to the initial requirement to set a new compliant password, and the increased burden of entering the more complex password every time the resource is accessed.

An example of how such settings, on the client device, may be altered may include utilizing functions that the original equipment manufacturer (OEM) has provided in the client device operating system (OS). In some embodiments, a client side application, or remote server, may, for example, call API's on the client device to alter the functionality of the OS or other application. Such calls may override, for example, original settings of the OS and/or user-defined settings.

In some embodiments, altering the setting may include increasing a required password complexity for at least one of the client device or the network. For example, many client device operating systems (OS's) include built in security functions that allow the user to set a password to unlock the device. These may be relatively simple passwords, such as 4 number codes. In embodiments, step 270 may include increasing the complexity of the required password, e.g. to require alphanumeric combinations, special symbols and/or longer character strings. Such changes may also be made to passwords required for client-side applications, as well as local or remote resources. In embodiments, the password complexity may be increased a plurality of times based on subsequent non-compliance determination, and may be repeated indefinitely or up to a maximum number of times. Such measures may be useful in encouraging the user to comply with the compliance rules by making the client device more difficult to use, or certain applications or resources more difficult to access. It is further noted that, in embodiments, increasing a required password complexity may include requiring a password for devices, applications, resources or networks that did not otherwise require a password.

Similarly, step 270 may include decreasing a password lifetime for at least one of the client device or the network. For example, many security protocols require passwords to be changed every month or other time frame, thereby limiting the lifetime of a current password. In some embodiments, the password lifetime may be reduced, for example, to 50%, or other amount, of the current lifetime. Such changes may also be made to passwords required for client-side applications, as well as local or remote resources. In embodiments, the password lifetime may be decreased a plurality of times based on subsequent non-compliance determination, and may be repeated indefinitely or up to a maximum number of times.

In some embodiments, step 270 may include restricting access to at least one of the client device, client device resource, or the network resource based on a geofence, a time and/or day of the week. For example, access to certain resources may be inhibited, e.g. by password, etc., when the device is outside of a given area, inside a given area, and/or during certain times or days. Such methods may rely on geo-location functionality included in a client device, or other methods such a detection of certain local area networks that indicate a certain location. In some embodiments, geofences may be set, for example, in a preferred network coverage area, around a particular building, or even around certain areas of a building.

In some embodiments, step 270 may include inhibiting a communication function of the client device, such as disabling outgoing or incoming calls, text messaging or other communication. Some embodiments may include automatically routing calls to the client device to another phone number, or blocking calls, based on geofence or time/day as discussed above, e.g. to discourage use of mobile devices when the user is in the office. It should be understood that such restrictions based on geofence and/or time or day, as discussed above, may inhibit access to given resources or functions, without denying such access in all circumstances.

By way of further example, some embodiments may include adjusting a setting based on a GPS, Near Field Communications (NFC), or other geofence, that blocks outgoing calls, blocks outgoing messages, routes inbound calls to an alternate number (such as a desk phone), and/or routes inbound calls or messages to an alternate address or device. In some embodiments, settings may route some inbound calls and/or messages to an alternate number, address or device, while allowing other inbound calls and/or messages to be received. For example, a first call that is received from a calling number or address may be diverted to an alternate number, address or device, but subsequent calls from the calling number or address may be allowed to pass through to the called device. Some embodiments may include disabling inbound calls, and providing an automated response to a source of the inbound calls, e.g. a message with an alternate contact number or address for the user.

Some embodiments may include adjusting a setting based on an NFC geofence, and may provide further functionality with respect to other NFC enabled devices, such as an NFC enabled computer, desk phone or other office device. For example, altered settings may block outgoing calls via a first carrier (such as a cellular phone carrier), and may route outgoing calls to an NFC-enabled device (such as a computer or desk phone that provides calling services using another carrier or network). Some embodiments may also include routing incoming calls to the NFC-enabled device.

For example, if a client device is detected within a certain NFC geofence, incoming calls to the client device may be routed to an NFC-enabled device associated with the geofence, such as a computer or desk phone that is configured to receive calls.

Such methods may be advantageous, for example, in discouraging the user from taking calls, sending messages, accessing certain web sites or applications (like games), etc. when they are in a certain area, such as the workplace, and/or at certain times, like during the workday, without prohibiting such access. Such methods may also be advantageous in encouraging the user to access certain resources only in a certain area, such as their workspace, without prohibiting such access outside of that space. The compliance parameters can be incrementally increased, and may reach a point where the access is impractically burdensome, or where access is blocked entirely.

Such methods may also be advantageous in determining that the user actually intended to access the resource in a certain location, and/or at a certain time, which may be of interest to resource managers and the like.

It should further be noted that factors such as geofences, time of day and day of week, may be incorporated in compliance rules. For example, accessing certain resources within a geofence and/or at a certain time or day, may be prohibited by a compliance rule, and initiate a setting alteration as discussed herein.

In some embodiments, altering the setting may be performed based on instructions provided by a remote server. For example, non-compliance may be determined by distribution service 174, e.g. based on information received from client device 120, received from service provider server 180, and/or from event log 178. The distribution service 174 may then send client side application 126 an initiating instruction to alter the setting.

The method may continue with step 280, in which any necessary remedial action may be taken based on the altered setting. For example, if the password requirements are changed, then the user may be prompted to input a new password according to the altered settings. Such steps need not be performed immediately after the setting is altered and may not take place, for example, until the next time the user attempts to access a particular application or resource. As noted previously, some embodiments may include sending, or receiving, an alert from the client device to a remote server including an indication of the altered setting, which may be performed in step 280. Such alerts may be used, for example, to initiate further monitoring of the client device or to provide a record that the distribution service 174, or the like, may refer to. In response to such an alert, the server may initiate a further remedial action, such as sending a message to the user of the device (e.g., a text message), further altering access requirements to a network resource, etc.

The method may proceed with step 290, in which a called application or resource may be accessed or rendered on the client device. As noted above, in step 290, all resources corresponding to the requested resource may be identified (if not already done so) and access to the identified resources may be provided. A given resource may require, for example, user credentials, device identifiers, profile compliance, compliance with distribution rules 171, or other measures to allow the access in step 290. For example, in certain embodiments, a determination may be made as to whether the requesting application itself complies with the necessary criteria to access the requested resource. This may include, for example, checks to ensure that an application has been updated to a current version, that the request includes valid user credentials, that the request is not coming from a blacklisted address, etc.

Various methods of controlling access and identifying resources that are subject to a particular request may be used. It should be appreciated that various of the below methodologies may also be implemented as compliance rules, and implemented in the foregoing compliance and incremental remediation steps. For example, such methods may use resource grouping identifiers 154, which may represent unique identifiers for previously determined resource groupings, and may be used to associate compliance rules, as well as to determine which resources 165 are served up to the user of the client device 120.

In some embodiments, the distribution service 174 determines which resources 165 to provide based on the resource grouping identifiers 154 associated with each resource 165. For instance, in the case of a managed client device 120, the distribution service 174 may first determine which resource grouping identifiers 154 are associated with user credentials 132 included in a request 177. In the case of an unmanaged client device, the distribution service 174 may first determine which resource grouping identifiers 154 are associated with profile or certificate information received from the client device 120.

Each resource grouping identifier 154 may be associated with a pairing of at least one of a plurality of approved user credentials and device identifiers 156 and/or a pairing of at least one of a plurality of approved profiles and certificates 159. In some embodiments, the distribution service 174 identifies one or more resources 165 associated with each one of the determined resource grouping identifiers 154. In some embodiments, the distribution service 174 identifies the resource 165 if the resource 165 is associated with all of the determined resource grouping identifiers 154. Additionally or alternatively, in some embodiments, the distribution service 174 identifies the resource 165 if it is associated with a threshold number of the resource grouping identifiers 154. The distribution service 174 may then provide the identified resources 165 to the client device 120 or otherwise allow the client device to access such resources 165.

In some embodiments, each resource 165 may be associated with a listing of approved resource-grouping identifiers 168 and one or more distribution rules 171 and/or compliance rules 179. The listing of approved resource-grouping identifiers 168 may include at least some of the resource-grouping identifiers 154 that regulate access to the respective resource. The listing of approved resource-grouping identifiers 168 may be predetermined by an administrator entity. For instance, the administrator entity may specify which of the resource-grouping identifiers 168 may be used to access to a respective one or more of the resources 165. Additionally or alternatively, distribution rules 171 may regulate how an entity having a combination of approved user credentials and device identifier may access the respective resource 165. For example, in some embodiments, the distribution rules 171 may describe a required and/or a permitted state that an accessing client device 120 may satisfy in order for the client device 120 to be permitted access to the resource 165. Non-limiting examples of distribution rules 171 may include (but are not) limited to hardware requirements, software requirements, configuration requirements, maintenance requirements of a computing device, and/or requirements related to the resource 165.

In certain embodiments, the distribution service 174 may facilitate accessing the resources 165 for the client device 120. In some embodiments, the requested resource(s) may be provided to client side application 126 based on receiving the request, and any other necessary validation, without further input from the user, e.g. the distribution service 174 automatically transmits the identified resources 165 that the client device 120 is authorized to receive. In some embodiments, the distribution service 174 may provide an operable hyperlink, or the like, to the client device 120, that is tied to a specific client side application. For instance, the client device 120 may receive an indication that the resource 165 is available for download and may transmit a request to the distribution service 174 for downloading the applicable resource 165. Upon receiving the request, the distribution service 165 may transmit the resource 165 to the client device 120.

Other access facilitating methods may include, for example, granting folder access, application downloads and/or access, etc. For example, the distribution service 174 may provide an appropriate user interface to the client device 120. The distribution service 174 may determine the resource grouping identifiers 154 of the resources 165 accessible using the profile 123 from the client device 120. In some embodiments, the distribution service 174 determines the resource grouping identifiers 154 based on the required certificate. For instance, each resource grouping identifier 154 may be associated with a profile/certificate. The distribution service 174 may determine one or more resource grouping identifiers 154 associated with the profile/certificate, as described above.

The resource may be rendered on the client device, for example, on the display 136 of the client device 120. In some embodiments, the resources 165 may be presented in a user interface 137 by decompressing compressed files and presenting the uncompressed files, mounting disk image files and presenting the mounted image files, running executable files and presenting the executed files, by enabling a data search of the resources 165 and presenting the featured output in a user interface, by calling on another application on the client device 120 to respond to data links contained within the resources 165, and/or by transmitting a part or the whole of the resources 165 to another application on the client device 120.

In some embodiments, compliance checks as described herein may continue while the resource is being rendered in step 290. In such embodiments, rendering of the resource may be suspended for any necessary remedial measures if a non-compliance is detected.

It should further be noted that any of the incremental compliance steps described herein can be applied to the access and rendering steps described above with respect to step 290.

The method may continue with step 295, in which an access record may be stored including information related to the application/resource access and rendering of step 290. These may include records, or logs such as event logs 138, 178 and 188, that associate the resource provided and the client device and may include different levels of detail. For example, the record may include one or more of a resource identifier, a resource version number, an application identifier, a certificate or other data confirming the access time and date of the resource, a certificate or other data confirming the resource having been rendered by the specific device, links to or addresses of the resource, etc.

It should be further noted that similar records may be stored in the event that the called application or resource is not opened, e.g. in step 260. Such records may be advantageously used, for example, by a service provider to determine whether a particular device is repeatedly attempting to access a resource in a non-compliant manner. Such records may be used in determining what, if any, remedial steps are appropriate in step 260, such as remotely disabling an application, remotely wiping applications or other resources from a device, sending alerts to an enterprise device manager, etc.

In some embodiments, additional compliance checks may be made (e.g. as in step 240) based on records, or other indicators, of previous failed compliance checks, setting alterations, and/or other remedial measures. In the event that a subsequent compliance check indicates that the relevant compliance rule is now satisfied, then an altered setting may be reset to a previous state. For example, if a previous non-compliance check and remediation caused a password requirement to be increased from 4 digits to 8 digits, a subsequent finding of compliance may be used to reset the password requirement to 4 digits. By way of further example, in the case of a usage requirement that restricts access to certain web sites (e.g. "blacklisted" sites), altered settings may be reset in the event that the device is found not to have accessed a restricted site in a given period of time, e.g. a week. In embodiments where more than one incremental compliance measure has been implemented, e.g. a plurality of more restrictive setting alterations have been applied based on repeated determinations of non-compliance, a subsequent finding of compliance may cause the altered setting(s) to be reset to an original state, or any of the previous states.

Although the distribution service 174, client side application 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 may show certain functionality and operations, some of which are described above as performed, for example, by the client device 120, distribution server 150, distribution service 174 and/or client side application 126. However, it should be appreciated that many of the functions described herein may be performed by either of client device 120 or distribution server 150, or may involve interaction of both client device 120 and distribution server 150. In some embodiments, certain steps (e.g. steps 200, 210) may be performed by the distribution server 150 while other (e.g., steps 220, 270) may be performed by the client device. In some embodiments, various steps (e.g., steps 230, 240, 250, 260, 270, 280, 295) could be performed by either device or both devices.

The flowchart of FIG. 2 may show certain functionality and operations described as performed by the distribution service 174 and client side application 126, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more steps may be scrambled relative to the order shown. Also, two or more blocks shown in succession in FIG. 2 may be executed concurrently or with partial concurrence. Further, in some embodiments, one or more of the steps shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Any logic or application described herein, including the distribution service 174 and the client side application 126, or other processes and modules running on distribution server 150 or client device 120, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

As used herein, a "profile" should be understood as referring to a file that is recognizable by the operating system (OS) of a user device, that defines one or more device parameters, typically set by a service manager such as an MDM, and that may include an embedded certificate that the OS will recognize and install for the device, such as in a "trust store" or "certificate store" or other suitable memory space (any of which may be generically herein as a "trust store" for ease of reference) of the device. Typically, the profile is formatted in a manner such that the particular OS is able to recognize and implement the settings defined therein when installed by a user. For example, a profile may be an XML file that contains settings (also referred to as parameters) to deploy to the OS of a client device. The parameters may set and/or control a variety of device settings, functions and the like, e.g. passcode policies, email account configurations, calendar, contact accounts, VPN settings, WiFi settings, restrictions on how and what features and components of the device can and cannot be used, etc. If the profile is uninstalled, disabled, becomes corrupted or is otherwise inactive, the OS will remove the corresponding certificate from its trust store.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   identifying, using a client device, a request to access a first resource;
   determining, using the client device, that a second resource is associated with accessing the first resource based on a resource group identifier that is associated with the first resource;
   determining, using the client device, a compliance rule that is associated with the first resource and the second resource based on the resource group identifier;
   determining, using the client device, that the compliance rule is violated;
   determining, using the client device, that the compliance rule is associated with an alternative setting that is more stringent than a current setting;
   changing, using the client device, the current setting to the alternative setting by increasing a password complexity requirement; and
   enforcing, using the client device, a remedial action instruction received from a remote computing device, wherein the remedial action instruction is received in an occurrence in which an alert has been transmitted to the remote computing device.

2. The method of claim 1, wherein changing the current setting to the alternative setting comprises adjusting an operating system setting of the client device.

3. The method of claim 1, further comprising:
   transmitting, using the client device, an alert to a remote computing device, wherein the alert comprises an indication of the alternative setting to be implemented in the client device.

4. The method of claim 1, wherein determining that the compliance rule is violated is based on an event log maintained by the client device.

5. The method of claim 1, wherein the first resource comprises an application, and identifying the request to access the first resource further comprises:
   initiating, using the client device, a limited opening of the application, wherein the limited opening causes the application to identify the compliance rule.

6. The method of claim 1, further comprising:
   determining, using the client device, the resource group identifier is associated with the first resource based on a user credential and a device identifier.

7. A system, comprising,
   a computing device that comprises a hardware processor;
   a memory in communication to the computing device, wherein the memory comprises a plurality of machine instructions that, when executed, cause the computing device to at least:
   identify a request to access a first resource;
   determine that a second resource is associated with accessing the first resource based on a resource group identifier that is associated with the first resource;

determine a compliance rule that is associated with the first resource and the second resource based on the resource group identifier;

determine that the compliance rule is violated;

determine that the compliance rule is associated with an alternative setting that is more stringent than a current setting;

change the current setting to the alternative setting by increasing a password complexity requirement; and enforce a remedial action instruction received from a remote computing device, wherein the remedial action instruction is received in an occurrence in which an alert has been transmitted to the remote computing device.

8. The system of claim 7, wherein changing the current setting to the alternative setting comprises adjusting an operating system setting of a client device.

9. The system of claim 7, wherein the plurality of machine instructions, when executed, further cause the computing device to at least:

transmit an alert to a remote computing device, wherein the alert comprises an indication of the alternative setting to be implemented in a client device.

10. The system of claim 7, wherein determining that the compliance rule is violated is based on an event log maintained by a client device.

11. The system of claim 7, wherein the first resource comprises an application, and identifying the request to access the first resource further causes the computing device to at least:

initiate a limited opening of the application, wherein the limited opening causes the application to identify the compliance rule.

12. The system of claim 7, wherein the plurality of machine instructions, when executed, further cause the computing device to at least:

determine the resource group identifier is associated with the first resource based on a user credential and a device identifier.

13. A non-transitory computer-readable medium embodying program instructions executable in a client computing device that, when executed by the client computing device, cause the client computing device to at least:

identify a request to access a first resource;

determine that a second resource is associated with accessing the first resource based on a resource group identifier that is associated with the first resource;

determine a compliance rule that is associated with the first resource and the second resource based on the resource group identifier;

determine that the compliance rule is violated;

determine that the compliance rule is associated with an alternative setting that is more stringent than a current setting;

change the current setting to the alternative setting by increasing a password complexity requirement; and enforce a remedial action instruction received from a remote computing device, wherein the remedial action instruction is received in an occurrence in which an alert has been transmitted to the remote computing device.

14. The non-transitory computer-readable medium of claim 13, wherein changing the current setting to the alternative setting comprises adjusting an operating system setting of a client device.

15. The non-transitory computer-readable medium of claim 13, wherein the program instructions, when executed by the client computing device, further cause the client computing device to at least:

transmit an alert to a remote computing device, wherein the alert comprises an indication of the alternative setting to be implemented in a client device.

16. The non-transitory computer-readable medium of claim 13, wherein determining that the compliance rule is violated is based on an event log maintained by a client device.

17. The non-transitory computer-readable medium of claim 13, wherein the first resource comprises an application, and identifying the request to access the first resource further causes the client computing device to at least:

initiate a limited opening of the application, wherein the limited opening causes the application to identify the compliance rule.

* * * * *